Figure 3:
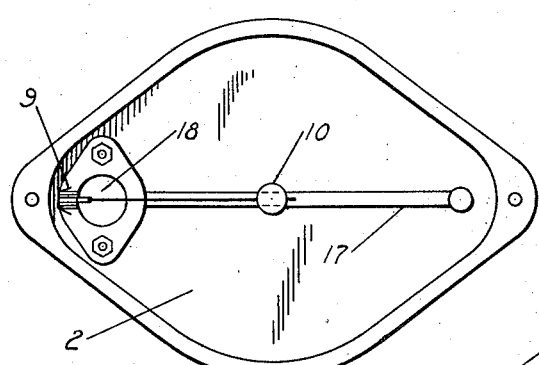

March 16, 1937.　　　M. E. DUNLAP　　　2,073,611
INSTRUMENT FOR MEASURING MOISTURE
Filed Oct. 20, 1936

INVENTOR.
MATTHEW ELBRIDGE DUNLAP
BY
ATTORNEYS.

Patented Mar. 16, 1937

2,073,611

UNITED STATES PATENT OFFICE 2,073,611

INSTRUMENT FOR MEASURING MOISTURE

Matthew Elbridge Dunlap, Madison, Wis., dedicated to the free use of the People of the United States of America Application October 20, 1936, Serial No. 106,540

2 Claims. (Cl. 73—24)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without payment to me of any royalty thereon.

I hereby dedicate the invention herein described to the free use of the People of the United States of America, to take effect upon the granting of a patent to me.

My invention relates to a new and improved moisture indicating instrument particularly for wood although, with slight modification, it may be used for air, textiles, grain, cereals, and similar materials having hygroscopic properties, which is inexpensive, accurate and easily used.

It has been established experimentally that a definite relation exists between the moisture content of a hygroscopic substance and relative humidity, thus the moisture content of a hygroscopic substance can be controlled by continually subjecting it to a constant relative humidity, or if a quantity of a hygroscopic material is confined in a relatively small space its moisture content will control the humidity inside the container. If a means of measuring the relative humidity is provided the moisture content of the substance may be determined because of this relationship.

My invention makes use of this relationship and contact is made by drilling a hole substantially ½ inch in diameter into the wood, and inserting therein a small hygroscopic element capable of changing in dimension with varying humidity conditions. I have used a very thin membrane derived from the intestines of cattle and known as bottle capping stock or goldbeaters' skin as the sensitive element, although other fibers such as hair or silk could be used. The changes in dimension of this small sheet are accurately measured and indicated on the dial as a percentage of moisture. The element is enclosed in a perforated housing so designed that when the instrument is placed in a drilled hole it will close it off completely and so prevent an interchange of moisture between the outside air and that confined in the drilled hole.

Designers of instruments measuring relative humidity have generally attempted to make their instruments read directly. This usually requires a long element, levers or rack to move the pointer through a satisfactory arc or distance. A heavy element capable of performing the work of moving the pointer is generally necessary. This is avoided in the present instrument and the operator makes his reading manually making it possible to use a very small and sensitive element and a light tension on the element which will not cause a permanent set or distortion of the membrane, which in many cases is sufficient to cause the instrument to read inaccurately.

Figure 1:
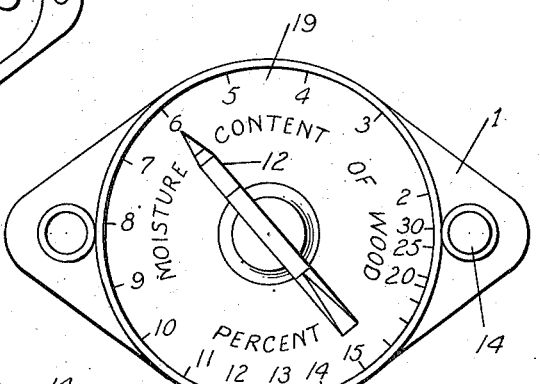
Figure 4:
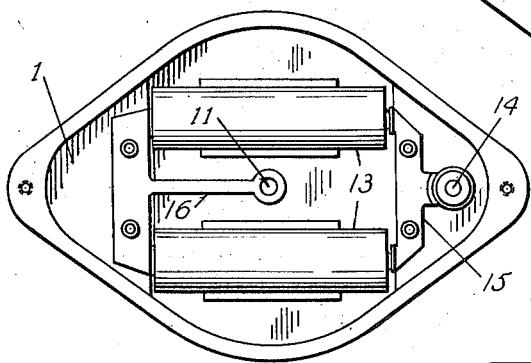
Figure 2:
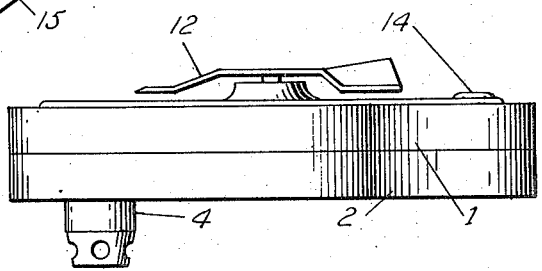
Figure 5:
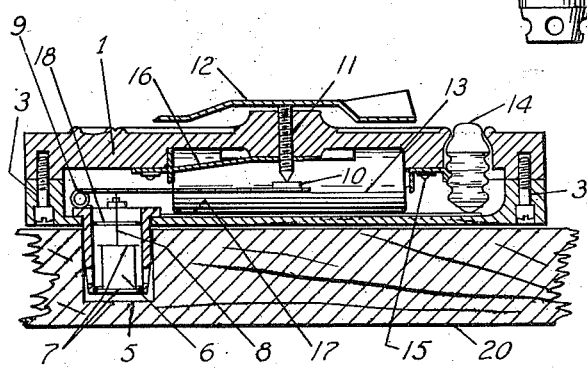

The device may best be described by referring to the attached drawing in which Figure 1 shows the top side of the instrument, and Figure 2 a side view. Figure 3 shows the inside of the lower part of the case, and Figure 4 the upper. Figure 5 is a sectional view taken longitudinally on the center line.

Similar numerals refer to similar parts throughout the several views.

The instrument is made up of two molded or cast parts—the upper portion 1 is attached to the lower section 2 by means of two machine screws 3. In the instrument shown, the case is composed of a non-conductor of electricity. Metal could be used also but the electrical connections would be different from those shown. Attached to the lower section of the case 2 is a perforated tubular projection 4 designed for insertion into a hole 5 drilled into the wood sample 20 so as to make a snug fit. The moisture sensitive element 6 supported on light wires 7 is connected rigidly at the end of the tubular projection 4. A wire 8 attached to the spring arm 9 holds the moisture sensitive element 6 under a slight tension. As moisture changes take place they affect the length of the element 6 causing the target 10 to move up or down. Mounted in the upper section 1 of the case is a screw 11 with a conical point. This contact point as well as target 10 is of a metal of good electrical conductivity and not easily corroded. When the instrument is not in use the pointer 12 is turned to the left at least one full turn. When a reading is to be taken the pointer 12 is rotated clockwise until the point of screw 11 makes an electrical contact with target 10, thus closing the circuit through batteries 13 causing the small electric lamp 14 to light. After the instrument has been calibrated, the position of the pointer 12 when the light starts to burn indicates directly the moisture content of the wood or other substance under test. Parts 15, 16, and 17 are simply electrical connections used in completing the electrical circuit. A rubber diaphragm 18 with a small hole in the center to permit the passage of the connecting wire is used to prevent diffusion of air from the drilled hole into the case of the instrument. Contacts are made and broken by a movement of the pointer of less than 1/200 of one revolution. The leverages and screw pitch are so designed that the complete range of measurable moisture content will fall within 1 revolution of the pointer.

The instrument is calibrated by mounting an arbitrary scale on the dial and exposing the instrument to known humidities. The corresponding moisture contents are plotted against the readings taken on the arbitrary scale and a smooth curve drawn through the points. The calibration measurements may be placed on a permanent dial 19, as shown in Figure 1.

The instrument may also be calibrated by taking actual moisture content measurements on samples of wood covering the range of the instrument. After oven drying the moisture content values are plotted against the arbitrary scale readings and a true calibration curve plotted as just described.

The instrument is used by drilling a hole deep enough to receive the moisture sensitive element, but not completely through the board. The sensitive element is inserted in this opening and left for 3 to 5 minutes when the reading may be taken by rotating the pointer to the right until the light burns. This point may be checked by making the contact several times.

A small light bulb is used which requires only 1½ volts. The current is supplied by two small size flash light cells connected in parallel which are now available everywhere. With this small lamp oxidation of the contact points is avoided.

Having thus described my invention, what I claim for Letters Patent is:

1. An instrument of the character described, comprising a moisture sensitive element, means connected to and actuated by said moisture sensitive element, a screw adapted to make and break contact with said means, a pointer attached to one end portion of said screw, a scale over which the pointer moves, an electrical circuit including a signal, said circuit being closed when said screw makes contact with said means.

2. A device for measuring the moisture content of hygroscopic materials, comprising a moisture sensitive element, tension means attached to said element, means adapted to make and break contact with said tension means, a pointer actuated by said make and break contact means, a scale over which the pointer moves, an electrical circuit including a signal light, said circuit being closed when said make and break means makes contact with said tension means.

MATTHEW ELBRIDGE DUNLAP.